United States Patent [19]

Spindler

[11] Patent Number: 5,618,417
[45] Date of Patent: Apr. 8, 1997

US005618417A

[54] WATER AERATION SYSTEM

[76] Inventor: William E. Spindler, 5306 Indiana Ave., Fort Wayne, Ind. 46807

[21] Appl. No.: 504,343

[22] Filed: Jul. 19, 1995

[51] Int. Cl.$^6$ .................................. C02F 1/20; C02F 1/72
[52] U.S. Cl. ........................ 210/170; 210/722; 210/220; 96/202; 96/206; 96/220
[58] Field of Search ...................................... 210/170, 220, 210/207, 221.1, 221.2, 722, 721, 760; 261/122.1, 126, 2, DIG. 42; 96/202, 206, 220

[56]  References Cited

U.S. PATENT DOCUMENTS

| 938,075 | 10/1909 | Reisert . |
| 1,123,011 | 12/1914 | Ripley . |
| 1,314,316 | 8/1919 | Flinn . |
| 2,352,901 | 7/1944 | Klein . |
| 2,560,978 | 7/1951 | Persson . |
| 2,669,440 | 2/1954 | Linderbergh . |
| 2,872,415 | 2/1959 | Schleyer . |
| 3,151,064 | 9/1964 | Lathrop . |
| 3,597,167 | 8/1971 | Marks . |
| 3,649,532 | 3/1972 | McLean . |
| 3,807,563 | 4/1974 | Reid, Jr. . |
| 4,139,456 | 2/1979 | Yabuuchi . |
| 4,555,335 | 11/1985 | Burris . |
| 4,582,610 | 4/1986 | Baker . |
| 4,696,739 | 9/1987 | Pedneault . |
| 4,764,272 | 8/1988 | Fox . |
| 5,011,597 | 4/1991 | Canzoneri . |
| 5,104,525 | 4/1992 | Roderick . |
| 5,173,092 | 12/1992 | Rudder . |
| 5,368,754 | 11/1994 | Von Klock . |

FOREIGN PATENT DOCUMENTS 47-38981  10/1972  Japan .

OTHER PUBLICATIONS

Brochure—Effective, Economical Tank Agitation, GAST Regenair Blowers, Apr. 1990.
Bulletin MM–100—Vertical Probe Liquid Level and Duel Pump Controls, ITT McDonnell & Miller, Sep. 1992.
Bulletin HPWV–1179—Hoffman Specialty, ITT, 1979.

*Primary Examiner*—Thomas M. Lithgow
*Attorney, Agent, or Firm*—Baker & Daniels

[57]  ABSTRACT

A water aeration system for receiving gas and/or iron laden water from a water source and delivering purified water to a service line. The system includes a tank with an internal volume fillable with water, a tank inlet, a tank outlet, and an aerator. Water is introduced into the tank through the tank inlet and passes downwardly within the tank. The downwardly moving water encounters a counterflow of upwardly migrating bubbles introduced into the tank by the aerator, and the air bubbles cause impurities in the water to precipitate out and settle onto the floor of the tank and gases to the vented to atmosphere. After moving to the bottom portion of the internal volume of the tank, the water passes upwardly through an upstanding water outlet pipe located within the tank internal volume and passes through the tank outlet to be removed from the tank. The system may also include a mechanism for flushing from the tank precipitates collected on the tank floor. The system may also use a regenerative blower as a portion of the aerator.

10 Claims, 3 Drawing Sheets

WATER AERATION SYSTEM

BACKGROUND OF THE INVENTION

The present invention pertains to a water treatment system, and, in particular, to a system which aerates water to remove objectional gases and iron from water. Potable and non-potable water supplies are thereby improved and/or rendered usable.

Many existing water sources, most notably wells but occasionally community water supply systems as well, provide a supply of water to a household or business which contains impurities. Commonly occurring impurities include iron and gases such as hydrogen sulfide in solution, and these impurities often cause the water to be unpalatable or malodorous to a consumer. Prior attempts to reduce water impurities and thereby improve water potability have used various purification techniques at water flow locations between the water source and the building being supplied with water. One existing technique utilized to remove impurities from water in a more convenient fashion than chemical addition is the natural process of aerating the water with air or ozone. Aeration is intended to cause iron oxide to precipitate from the water as well as cause a release of foul smelling hydrogen sulfide from the water prior to the water reaching the consumer.

A variety of water aeration systems are known, including those disclosed in U.S. Pat. Nos. 4,555,335; 3,151,064; 2,872,415 and 2,560,978. These systems, as well as other existing water aeration systems, are typically deficient in one or more of a variety of respects. For instance, while extended aerated water flow paths allow more time for materials such as iron oxide to precipitate from the aerated water, extended flow paths have frequently been omitted from existing systems or provided in a highly complicated and potentially expensive fashion.

A second deficiency of many existing aeration systems results from their employment of air compressors to provide the air introduced into the water for aeration. While capable of introducing air into the system, air compressors typically output a low volume of air at a relatively high pressure, rather than a higher volume of lower pressure air more suitable for aeration. Consequently, to provide the desired amount of aerating bubbles, compressors frequently require significant amounts of input energy, which makes their operation expensive. In addition, the use of pistons and other associated moving linkages in air compressors increases noise and the likelihood of component breakdown, possible introduction of hydrocarbons into the water being aerated, and potentially expensive maintenance.

Still another deficiency of many existing systems is that frequently the waste material which precipitates from the impure water during aeration settles to the bottom of the aeration tank or vessel without a means to be removed other than filtration. By providing an automatic solenoid blowdown valve in the aeration vessel at the lowest internal point, much of the waste material can be removed to the sewer thus allowing minimal or no filtration.

Thus, it is desirable to provide a system for aerating water which overcomes these disadvantages.

SUMMARY OF THE INVENTION

The present invention provides a water aeration system which purifies gas and/or iron laden water by first forcing water downwardly within a tank against a counterflow of aeration bubbles, and then forcing the water upwardly through a vertical outlet pipe to be discharged from the tank. The invention also provides a configuration for conveniently and automatically expelling from the aerating tank, gases, and sediment precipitated from the impure water, as well as employs a regenerative blower to provide for water aeration in an economical manner.

In one form thereof, the present invention provides a water aeration system for receiving gas and iron laden water from a water source and delivering at least partially gas free and iron free water to a service line. The system includes a tank with an internal volume fillable with water. Arranged in flow communication with the water source is a tank inlet through which impure water is introduced into the tank internal volume. An aerator introduces air bubbles into the tank below the tank inlet, and the air bubbles migrate upwardly through the impure water introduced into the tank to purify the water. Arranged in flow communication with the service line is a tank outlet through which purified or conditioned water is removed from the tank. The system also includes at least one generally upstanding water outlet pipe located within the internal volume. The water inlet port of this outlet water pipe is positioned within a bottom portion of the tank internal volume, and the water outlet port of this outlet water pipe is positioned above the water inlet port and is connected in flow communication with the tank outlet. During operation, the impure water introduced through the tank inlet first passes downwardly to the tank internal volume bottom portion while being subjected to the air bubbles for purification, then enters the water inlet port and passes upwardly within the upstanding water outlet pipe, and then exits through the water outlet port into the tank outlet for removal from the tank internal volume.

In another embodiment thereof, the present invention provides another water aeration system for receiving gas and/or iron laden impure water from a water source and delivering at least partially purified water to a service line. The system includes a tank with an internal volume filled with water. The tank includes an internal bottom surface with an opening for waste removal. The system also includes a tank inlet, an aerator, and a tank outlet. The tank inlet is arranged in flow communication with the water source and allows the introduction of impure water into the tank internal volume at a first elevation. The aerator introduces air bubbles into the tank at an elevation below the tank inlet, and these air bubbles migrate upwardly through the impure water introduced into the tank internal volume to cause impurities in the water to precipitate out and collect as sediment on the tank bottom surface. The tank outlet is arranged in flow communication with the service line and allows removal of purified water from a bottom portion of the tank internal volume. The system also includes a means for flushing the collected sediment out of the tank. The flushing means includes a disposal conduit extending from the bottom surface opening toward a disposal system, as well as a valve means for opening and closing the disposal conduit. Sediment is flushed through the bottom surface opening and the disposal conduit by the water within the internal tank when the valve means opens the disposal conduit.

In still another form thereof, the present invention provides another water aeration system for receiving gas and/or iron laden water from a water source and delivering purified water to a service line. The system includes a tank with an internal volume fillable with water, a tank inlet, an aerator, and a tank outlet. The tank inlet is arranged in flow communication with the water source and allows impure water to be introduced into the tank internal volume at a first elevation. The aerator introduces air bubbles into the tank at an elevation below the tank inlet. The aerator includes a regenerative blower for providing air at a sufficient pressure to effect bubbling within the tank internal volume, and the air bubbles migrate upwardly through the impure water introduced into the tank internal volume to remove iron and gases from the water. The tank outlet is arranged in flow communication with the service line and allows removal of the purified water from a bottom portion of the tank internal volumes.

One advantage of the present invention is that the travel path of the water introduced into the aeration system is extended by a vertical water outlet pipe that forces the water inlet at the top of the tank to first flow downwardly within the tank and then upwardly through the outlet pipe, and this extended path allows further water purification.

Another advantage of the present invention is that discharge from the tank of the precipitated impurities can be accomplished automatically and without requiring filter media.

Still another advantage of the present invention is that water aeration is achieved with a regenerative blower, which provides a greater flow rate of purifying air than most compressors for a given output air pressure and is relatively maintenance free and inexpensive to operate.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Although the drawings represent embodiments of the invention, the drawings are not necessarily to scale and certain features may be exaggerated in order to better illustrate and explain the present invention.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may utilize their teachings.

Figure 1:
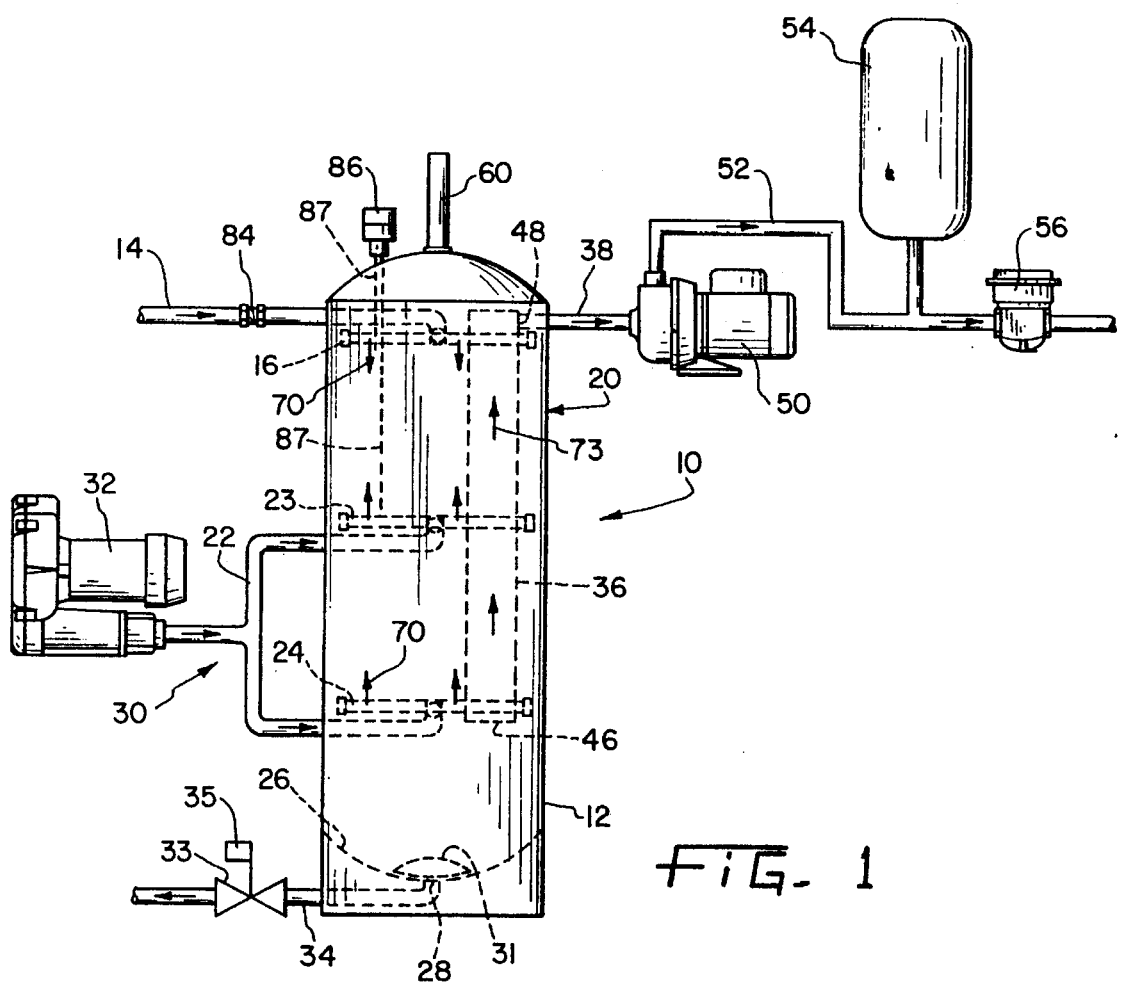
FIG. 1 is a schematic diagram of a first embodiment of the water aeration system of the present invention which is also open to the atmosphere.

Referring now to FIG. 1, there is shown a schematic diagram of one embodiment of water aeration system of the present invention. The water aeration system, generally designated 10, includes a tank 12 which defines an internal volume fillable with water. Impure water which requires aeration is supplied to tank 12 from a water source (not shown) through conduit or pipe 14, which passes through check valve or solenoid valve 84 and a port in tank 12 and feeds an apertured distribution pipe 16 having multiple openings and arranged in an upper portion 20 of the tank internal volume. The shown distribution pipe is only a representative tank inlet, as other inlet configurations suitable to introduce water near the top of tank 12 are within the scope of the invention. The source of high pressure water is not material to the present invention and may be a community water supply system having water quality with which the user of system 10 is dissatisfied, such as a sulfurous odor or high iron content. Alternatively, the water source can be a well pump to ensure an adequate supply of water.

The aerating bubbles within tank 12 which serve to purify the introduced water are generated by a suitable aerator, which is generally designated 30. In this embodiment, aerator 30 employs an air propelling machine 32 which forces air through forked pipe 22 and into a pair of branch pipes 23, 24 immersed within the water in the tank internal volume. Air is used in a general sense herein, and is intended to encompass atmospheric air as well as ozone or other gases to be used in the aeration process. Pipes 23, 24 may be positioned at different heights within the tank internal volume provided they inject bubbles at a height below the tank inlet so as to achieve counterflow and a proper aerating effect. Air flowing through pipes 23, 24 exits through small openings along the lengths of the pipes 23, 24 to create air bubbles which naturally migrate upwardly within the water. Although two branch pipes of elongate shape are shown (2 stage), the present inventions may be practiced with as few as one branch pipe (single stage), or with additional branch pipes, or with pipes of various configurations.

Figure 2:
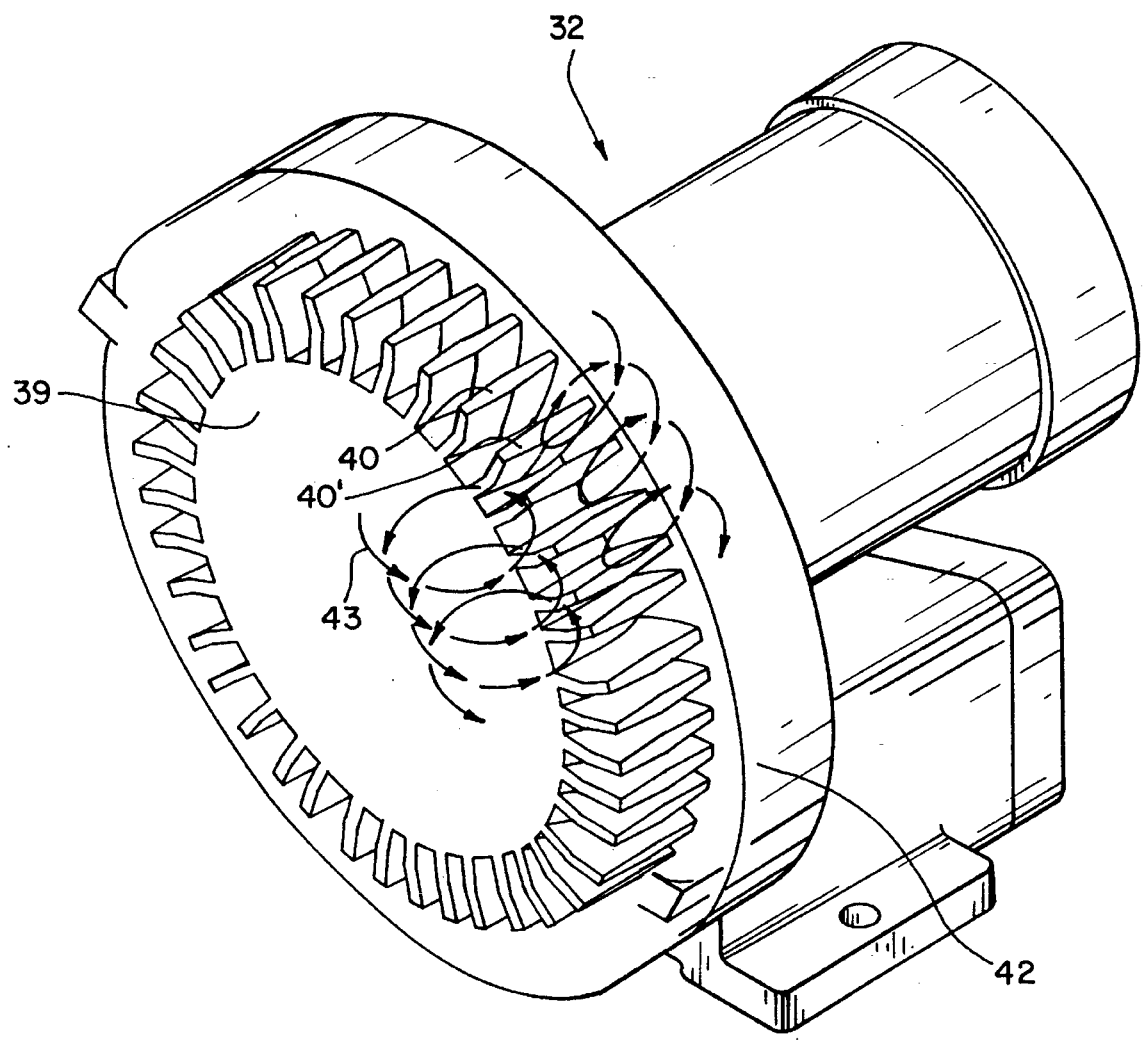
FIG. 2 is fragmentary perspective view of a regenerative blower for use with the present invention.

Air propelling machine 32 may be of a conventional design and is preferably a regenerative blower. Referring now to FIG. 2, there is shown a fragmentary perspective view of a representative conventional regenerative blower 32. As impeller 39 of blower 32 rotates, centrifugal force moves the air from the root of blade 40 to the blade tip. After leaving the tip of blade 40, the air proceeds to flow around the contour of housing 42 and back down to the root of the succeeding blade 40'. This air flow action is repeated for successive blades, and a portion of the air flow pattern is indicated at 43. The air flow action results in the blower generating a high volume of air flow at a pressure sufficient to be introduced into the internal volume of water. A typical residential unit could utilize a blower developing 40 cfm at 39 inches of head. Regenerative blowers of this type are available from Gast Manufacturing Corporation of Benton Harbor, Mich., and a blower which delivers 40 cubic feet per minute at 39 inches of head has been found suitable for use with a 24 inch diameter tank.

Referring again to FIG. 1, the floor or internal bottom surface 26 of tank 12 is concavely shaped and includes a centrally situated waste removal opening 28. Impurities in the water which precipitate out during aeration collect as a layer of sediment on surface 26. A convex dome 31 spaced apart from bottom surface 26 is positioned above opening 28 to enable any precipitate to be removed more completely when valve 33 is opened. The total space between the edge of convex dome 31 and surface 26 should approximate the internal area of opening 28. Outwardly projecting from tank 12 is a disposal pipe 34 which is connected to opening 28. Disposal pipe 34 leads to a waste system, such as the community sewer line or a septic tank or field. A solenoid valve and a valve control, which are abstractly represented at 33 and 35 respectively, serve to open and close disposal pipe 34 to control a flushing of the collected sediment in a manner described further below.

Vertically arranged within the internal volume of tank 12 is water outlet pipe 36 that advantageously increases the travel flow path of iron oxide or other solids and reduces the outgoing water velocity thereby increasing the time for precipitation to occur. Pipe 36 is preferably many times larger in cross-sectional area than pipes 14 and 38, for example, 2 to 10 times as large. For example, pipe 36 has a diameter of 6 inches. While shown in this embodiment as a single pipe made of polyvinyl chloride or other suitable materials, pipe 36 may alternatively be comprised of multiple pipes of smaller diameter possibly disposed at different points around the tank interior circumference. The bottom end of outlet pipe 36 serves as an inlet port 46 for purified water. To force the impure water introduced near the top of tank 12 to travel downward as far as possible through the aerating bubbles to further water purification, inlet port 46 is preferably positioned within bottom portion of the tank internal volume, e.g., preferably in the lower third of the tank. Inlet port 46 is preferably sufficiently spaced from bottom surface 26 so as to not extend into or stir up the sediment which collects on the sloped bottom surface 26 between waste flushings. At the upper portion 20 of the tank volume, outlet port 48 of water outlet pipe 36 communicates directly with conduit 38, which extends outwardly through tank 12 near the tank top and functions as the tank outlet in this embodiment. To maximize the upward travel of the water flow path, outlet port 48 is preferably at the top portion of the tank internal volume. Conduit 38 could also be routed to extend through other portions of tank 12 if desired. Conduit 38 is connected to distribution pump 50. Outlet pipe 52 routes high pressure water to pressure tank 54, such as a bladder tank, and flow switch or pressure switch 56 to the service line to a building such as a residential dwelling or commercial office. A fluid flow switch 56, such as a FS6 Series Flow Switch available from McDonnell & Miller of Chicago, Ill., or a pressure switch such as Allen Bradley 836-C7A of Milwaukee, Wis., is operably circuited to the building.

The construction of water aeration system 10 will be further understood in view of the following explanation of its operation. When a spigot is turned on in the building, flow switch or pressure switch 56 senses the flow or pressure drop and causes pump 50 to begin operating. When the water level reaches the low level limit, the well pump is activated (or solenoid 84 is opened when municipal water is used) as well as the regenerative blower 32 which creates air bubbles within the water tank 12. When the high water level is reached and is sensed by the high level probe of level switch 86, the well pump shuts off or solenoid valve 84 is closed when municipal water is used. Regenerative blower 32 halts operation shortly thereafter based on a timer. The bubbles begin to migrate upwardly from branch pipes 23, 24 as represented by arrows 70. During its extended downward flow, the impure water is subjected to the counterflow of upwardly migrating air bubbles, which naturally effects the release of gases from the water and the precipitation of materials such as iron oxides from the water. The released gases and air bubbles float upwardly and escape from tank 12 through vent 60. The precipitated particles settle onto bottom surface 26.

Upon reaching inlet port 46, the now purified water reverses direction and passes upwardly through the large diameter water outlet pipe 36 as shown at 73. As the water travels upwardly, further precipitation and therefore purification may take place, and the additional precipitated particles may conveniently drop downward onto sloped surface 26 due to the vertical orientation of pipe 36. The purified water passes through outlet port 48 and into conduit 38 connected to distribution pump 50 to be delivered to the building. When the spigot in the building is turned off, flow switch 56 a or pressure switch closes and pump 50 halts operation.

To expel collected sediment from tank 12, valve 33 is opened and the sediment is naturally flushed through waste removal opening 28 and into disposal pipe 34 by gravity. For convenience, opening of valve 33 preferably occurs automatically. For example, a timer (not shown) can be circuited with a conventional valve control 35 to automatically operate valve 33 at a selected time during the day, or a sensor within tank 12 and connected to control 35 can cause valve 33 to operate when a predetermined quantity of sediment has collected on bottom surface 26. Further, a counter circuited with control 35 can be used to initiate the opening of valve 33 after a selected number of cycles of operation for aerator 32.

Figure 3:
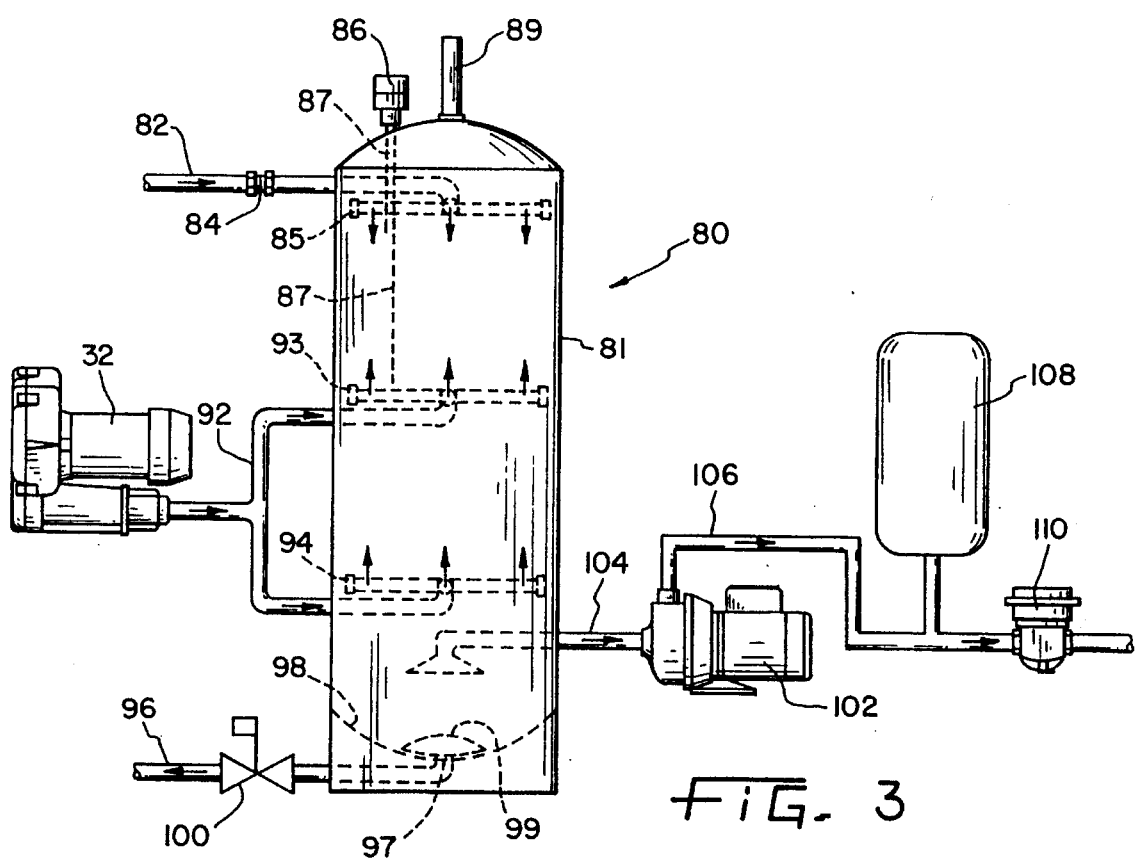
FIG. 3 is a schematic diagram of a second embodiment of the water aeration system of the present invention which is also open to the atmosphere.

Referring now to FIG. 3, there is shown a schematic diagram of a second embodiment of a water aeration system 80 which is open to the atmosphere and is similar in many respects to the water aeration system 10 of FIG. 1. Impure water is supplied to tank 12 from a water source (not shown) through pipe 82, check valve or solenoid valve 84, and apertured distribution pipe 85 arranged near the top of the tank internal volume. A hi-low level sensor switch 86 includes downwardly extending probes represented at 87 for sensing water and serves to regulate water level within tank 81. Sensor switches of this type are commercially available, such as from McDonnell & Miller of Chicago, Ill., and are preferred over float switches that can be erratic due to the violent air water interface caused by the regen blower, relative high maintenance, and froth occurring with some waters at the water surface within the tank. For example, when the water source is a well with a well pump as is expected in many uses, hi-low switch 86 is circuited with the well pump and activates the pump when the water level is low. Impure water would then be pumped into tank 81 until the water level is sensed by switch 86 to be at an acceptable higher level, and the pump would then be deactivated. Valve 84 would be configured as a solenoid valve in such an arrangement. For use with community water supply systems, and provided valve 84 is of a conventional supply valve design, hi-low switch 86 could control valve 84 to regulate water level in tank 81. The top of tank 81 is provided with a vent 89 to allow gases released from the water and the aerating air to escape from tank 81 to the atmosphere.

The aerator and waste flushing mechanism of system 80 are shown identical to their counterpart components of system 10 (FIG. 1). The aerator includes regenerative air pump 32, forked pipe 92, and apertured branch pipes 93, 94. The aerator is activated when the well pump or solenoid valve is energized and deactivated shortly after the well pump is deenergized by means of a control timer. The waste flushing mechanism includes disposal pipe 96 connected between the waste system and the waste removal opening 97 in tank bottom surface 98 covered by dome 99. Valve mechanism 100 controls the opening of pipe 96.

Because the water in tank 81 is open to the atmosphere and not pressurized, distribution pump 102 is used to pump water from tank 81 to the serviced building. A horizontally configured tank outlet pipe 104, which opens downwardly into the bottom region of the tank internal volume in order to remove water which has been purified during its passage downwardly through the aerating bubbles, feeds the inlet of distribution pump 102. Outlet pipe 106 routes high pressure water to pressure tank 108, such as a bladder pressure tank, and through flow switch or pressure switch 100 to a building. Pressure tank 108 provides a high pressure reserve used for starting flow switch or pressure switch 110 when a spigot in the building is turned on.

This invention could be incorporated in a system that is closed to the atmosphere, if desired. In such a system a conventional vent gas valve would be installed at the top of the tank.

While this invention has been described as having multiple designs, the present invention may be further modified within the spirit and scope of this disclosure. This application is therefore intended to cover these and any other variations, uses, or adaptations of the invention using its general principles. Further, the application is intended to cover such departures from the present disclosure as come within known or customary practice in the art to which this invention pertains.

I claim:

1. A water aeration system for receiving gas and/or iron laden water from a water source and delivering at least partially purified water to a service line, the system comprising:

a tank including an internal volume fillable with water, said internal volume comprising a top portion and a bottom portion;

a tank inlet, arranged in flow communication with the water source, through which the gas or iron laden water is introducible into said tank internal volume at a first elevation;

an aerator for introducing air bubbles into said tank at at least one elevation below said tank inlet, wherein said air bubbles migrate upwardly through the water introduced into said tank internal volume to at least partially purify the water, wherein said aerator comprises a regenerative blower for providing air at a sufficient pressure and volume to effect bubbling within said tank internal volume for causing said iron in said gas and/or iron laden water to precipitate, and said gas in said water to vent, whereby purified water is obtained;

a tank outlet, arranged in flow communication with the service line, through which purified water is removable from said tank internal volume; and at least one generally upstanding water outlet pipe located within said internal volume and including a water inlet port and a water outlet port, wherein said water inlet port is positioned within said bottom portion of said tank internal volume, and wherein said water outlet port is positioned above said water inlet port and is connected in flow communication with said tank outlet;

whereby the water introduced through said tank inlet passes downwardly within said tank internal volume to said tank internal volume bottom portion while being subjected to the air bubbles for purification, enters said water inlet port and passes upwardly within said at least one generally upstanding water outlet pipe, and exists through said water outlet port into said tank outlet for removal from said tank internal volume.

2. The water aeration system as claim 1 wherein said water outlet port and said tank inlet are each positioned within said tank internal volume top portion.

3. The water aeration system of claim 1 wherein said at least one water outlet pipe is vertically arranged within said tank internal volume.

4. The water aeration system of claim 3 including a plurality of vertically spaced said aerators.

5. The water aeration system of claim 1 further comprising a conduit extending from said tank outlet and having a first flow area, and said upstanding pipe has a flow area larger than the flow area of said conduit.

6. The water aeration system of claim 1 wherein said tank further comprises an internal bottom surface with an opening for waste removal, and wherein the system further comprises means for flushing sediment out of said tank which accumulates when impurities in the water precipitate out and collect on said tank bottom surface, and flushing means comprising a disposal conduit extending from said bottom surface opening toward a waste system, said flushing means further comprising a valve means for opening and closing said disposal conduit, and wherein sediment is flushed through said bottom surface opening and said disposal conduit by the water within said tank internal volume when said valve means opens said disposal conduit.

7. A water aeration system for receiving gas and/or iron laden water from a water source and delivering purified water to a service line, the system comprising:

a tank including an internal volume fillable with water, said tank comprising an internal bottom surface with an opening for waste removal;

a tank inlet, arranged in flow communication with the water source, through which the gas and/or iron laden water is introducible into said tank internal volume at a first elevation;

an aerator for introducing air bubbles into said tank at at least one elevation below said tank inlet, wherein said air bubbles migrate upwardly through the water introduced into said tank internal volume to cause impurities in the water to precipitate out and collect as sediment on said tank bottom surface, wherein said aerator comprises a regenerative blower for providing air at a sufficient pressure and volume to effect bubbling within said tank internal volume for causing said iron in said gas and/or iron laden water to precipitate, and said gas in said water to vent, whereby purified water is obtained;

a tank outlet, arranged in flow communication with the service line, through which purified water is removable from said tank internal volume; and means for flushing the collected sediment out of said tank, said flushing means comprising a disposal conduit extending from said bottom surface opening toward a waste system, said flushing means further comprising a valve for opening and closing said disposal conduit, and wherein sediment is flushed through said bottom surface opening and said disposal conduit by the water within said tank internal volume when said valve opens said disposal conduit.

8. The water aeration system of claim 7 wherein said valve comprises a solenoid valve.

9. The water aeration system of claim 7 wherein said flushing means comprises means for automatically operating said valve.

10. The water aeration system of claim 7 wherein said tank bottom surface around said waste removal opening is concavely shaped, and wherein said system further comprises a dome positioned over said waste removal opening and in spaced apart relationship with said bottom surface.

* * * * *

UNITED STATES PATENT AND TRADEMARK OFFICE
CERTIFICATE OF CORRECTION

PATENT NO. : 5,618,417
DATED : April 8, 1997
INVENTOR(S) : William E. Spindler

It is certified that error appears in the above-indentified patent and that said Letters Patent is hereby corrected as shown below:

Claim 1, column 7, line 34, delete "iron in said gas and/or iron laden water" and substitute therefor --gas to be released from the water or said iron--.

Claim 1, column 7, line 35, after "precipitate" delete "and said gas in said water to vent,".

Claim 1, column 7, line 52, delete "exists" and substitute therefor --exit--.

Claim 7, column 8, line 17, delete "gas and/or".

Claim 7, column 8, line 31, delete "impurities" and substitute therefor --iron--.

Claim 7, column 8, line 37, delete "gas and/or"

Claim 7, column 8, lines 37-38, delete "and said gas in said water to vent,".

Signed and Sealed this

Twenty-second Day of July, 1997

Attest:

BRUCE LEHMAN

*Attesting Officer*  *Commissioner of Patents and Trademarks*